United States Patent [19]

Chi et al.

[11] Patent Number: 4,460,640

[45] Date of Patent: Jul. 17, 1984

[54] FIBER REINFORCED GLASS MATRIX COMPOSITES

[75] Inventors: Frank K. Chi; Gary L. Stark, both of Midland, Mich.

[73] Assignee: Dow Corning Corporation, Midland, Mich.

[21] Appl. No.: 482,682

[22] Filed: Apr. 6, 1983

[51] Int. Cl.$^3$ ............................................... D03D 3/00
[52] U.S. Cl. ..................................... 428/224; 156/89; 156/155; 156/296; 156/307.5; 156/307.7; 156/329; 427/387; 428/232; 428/245; 428/260; 428/269; 428/290; 428/294; 428/367; 428/391; 428/408; 428/447; 428/902
[58] Field of Search ............... 156/89, 155, 296, 307.3, 156/307.7, 329, 307.5; 428/224, 245, 391, 392, 367, 408, 446, 902, 232, 260, 266, 269, 272, 290, 294, 447; 427/387

[56] References Cited

PUBLICATIONS

S. R. Levitt, Journal of Materials Science 8 (1973) 793-806 "High-Strength Graphite Fiber/Lithium Aluminosilicate Composites".

J. J. Brennan, United Technologies Research Center, Aug. 15, 1979 Annual Report R79-914401-2 "Program to Study SiC Fiber Reinforced Glass Matrix Composites".

J. F. Bacon, et al., United Tech. Research Center Jun. 1978, Report N74-11126 "Research on Graphite Reinforced Glass Matrix Composites".

*Primary Examiner*—James J. Bell
*Attorney, Agent, or Firm*—Richard A. Kaba

[57] ABSTRACT

What is disclosed is a method of preparing fiber reinforced glass composites from high modulus fibers and organopolysiloxane resins. The composites are obtained by firing a partially cured, pressed, and post-cured prepreg to an elevated temperature in an inert atmosphere. A simple, low temperature laminating procedure is used in the composite preparation in place of the standard hot pressing technique.

77 Claims, No Drawings

FIBER REINFORCED GLASS MATRIX COMPOSITES

BACKGROUND OF INVENTION

This invention deals with new and novel fiber reinforced glass composites. Ceramics as high performance engineering materials have been more of a novelty than a commercially successful technical venture owing to the many disadvantages associated with the manufacture of these types of materials.

In order for ceramics to find wider applicability as engineering materials, major improvements in strength and toughness, i.e. improved resistance to thermal and mechanical shock, are required. A great potential for ceramics as high performance engineering materials exists in many applications provided that ceramics which are not intrinsically flaw sensitive or brittle can be produced with relative ease. For example, monolithic silicon carbides and silicon nitrides with modulus of rupture (MOR) greater than 50,000 psi have been prepared.

Several attempts at preparing better ceramic composites have been disclosed. One such attempt is disclosed in an article by S. R. Levitt entitled "High strength graphite fiber/lithium aluminosilicate composites", J. Mat. Sci., 8, 793(1973). Levitt discloses that ceramic matrix compositions having the composition $Li_2O.Al_2O_3.nSiO_2$ wherein n has a value of 3, 4 and 8, have been developed with a high volume fraction of unidirectionally aligned graphite fibers.

In a report prepared by J. J. Brennan, "Program to Study SiC Fiber Reinforced Glass Matrix Composites", UTRC Annual Report R79-914401-2 (1979), matrix compositions from magnesium aluminosilicate as well as compositions of lithium aluminosilicate in combination with silicon carbide fibers were employed to prepare composites. Brennan reports that there were fabrication difficulties in this system due to lack of wetting and bonding between the fiber and matrix.

Finally, a NASA Contract Report, "Research on Graphite Reinforced Glass Matrix Composites", J. F. Bacom, et al. NTIS Report N79-11126 (1978), discloses a combination of graphite fibers and borosilicate glass to give composites.

All of these approaches to engineering materials require arduous hot-pressing techniques. The hot-pressing technique generally requires temperatures of greater than 1500° C. and pressures of 1000–5000 psi.

The present invention overcomes the disadvantages of the prior art methods because the composites of this invention prepared from carbon or silicon carbide fibers and organopolysiloxane resins, as described herein, require only a simple laminating process without using a hot-press technique. Further, composites with excellent physical properties can be obtained.

THE INVENTION

According to the present invention fiber reinforced glass composites can be obtained by firing a partially cured, pressed and post-cured prepreg to an elevated temperature, in an inert atmosphere such as argon, nitrogen, helium, or under a vacuum.

The fiber reinforced glass composites are prepared by a method which comprises (A) impregnating high modulus fibers with a thermosetting organopolysiloxane resin, dissolved in an organic solvent;
(B) forming a prepreg by drying the product from (A);
(C) heating the dried product of (B) at an elevated temperature;
(D) pressing the prepreg from (C) at a temperature not greater than about 300° C.;
(E) curing the pressed prepreg from (D) at a temperature not greater than about 300° C. for a time sufficient to insure complete or nearly complete cross-linking in the prepreg;
(F) slowly firing the pressed and cured prepreg from (E) to a temperature of at least 1000° C. in an inert atmosphere or vacuum until a fiber reinforced glass composite is obtained; and
(G) cooling the fiber reinforced glass composite.

For purposes of this invention, the fibers most useful herein are high modulus silicon carbide and carbon fibers. Examples of such fibers include carbon fibers containing 6000 filaments per tow or strand available from the Celanese Corporation, 86 Morris Avenue, Summit, N.J., U.S.A. under the trademark "Celion" and silicon carbide fibers available from Nippon Carbon Company, Ltd., Tokyo, Japan under the trademark "Nicalon". Naturally, other high modulus fibers, such as, for example, a alumina-boria-silica fiber available from Minnesota Minning and Manufacturing Company, St. Paul, Minn., U.S.A. under the tradename "Nextel 312", can be employed in this invention. It is preferred that the fibers used in the composites are essentially unidirectional and continuous fibers or woven fabrics. Unidirectional or woven fibers in the composite tend to lend greater strength to the composite. By "essentially unidirectional and continuous" it is meant that the fibers in the composite are generally in a parallel alignment and that the individual fibers extend through the composite in a generally unbroken manner. Generally, the fibers are treated prior to impregnation to remove any size or surface treatment used by the manufacturer. For example, the fibers can be subjected to an open flame treatment to burn the size away. Quite often, the fibers are soaked in solvents to remove such coatings. The fibers may be then pretreated to allow the organopolysiloxane resin solution to wet the fibers much better. This pretreatment allows better adhesion of the matrix with the fibers of the composite which leads to better physical properties in the final composite product. Typically, the fibers are treated with organofunctional silanes or organofunctional silanes in conjunction with organic resins. These types of materials are known for use on glass cloth composites and the like. For example, 3-glycidoxypropyltrimethoxysilane (manufactured by Dow Corning Corporation, Midland, Mich., U.S.A.), alone or combined with a melamine resin, trademark Cymel 303 (manufactured by American Cyanamid, Wayne, N.J.), make excellent pretreatments for the fibers in this invention. Another example of a suitable pretreatment is a siloxane copolymer containing $(CH_3)_3SiO_{\frac{1}{2}}$ and $SiO_2$ units as described in U.S. Pat. No. 2,676,182 (Apr. 20, 1954).

The organopolysiloxane resins useful in preparing the composites of this invention must be of a thermosetting nature and also be capable of being transformed into a ceramic material. By "thermosetting" it is meant that the organopolysiloxane resin can be made to flow or soften upon the initial application of heat or heat and pressure but solidifies or sets upon further heating via cross-linking in the polymer resin. The organopolysiloxane resins must also be capable of being converted into silicon and carbon containing ceramic materials upon firing to temperatures of 1000° C. or more.

Certain organopolysiloxanes useful in this invention are described in Mink et al., U.S. Pat. No. 3,944,519 (issued Mar. 16, 1976) and LeGrow, U.S. Pat. No. 4,234,713 (issued Nov. 18, 1980) which are hereby incorporated by reference. Both patents describe organopolysiloxane resins where the cross-linking occurs mainly by the addition reaction of organopolysiloxanes containing SiH groups to organopolysiloxanes containing $CH_2=CHSi\equiv$ groups wherein the addition reaction is catalyzed by platinum containing compounds.

The organopolysiloxane resins described in U.S. Pat. No. 3,944,519 can be obtained by reacting
(a) an organopolysiloxane containing from 75 to 85 mol percent $C_6H_5SiO_{3/2}$ units and 15 to 25 mol percent $CH_2=CH(CH_3)_2SiO_{\frac{1}{2}}$ units, said organopolysiloxane having an average of at least 8 silicon atoms per molecule; with
(b) an organopolysiloxane of the formula $$H(CH_3)_2SiO\underset{\underset{C_6H_5}{|}}{\overset{\overset{C_6H_5}{|}}{Si}}OSi(CH_3)_2H,$$

said organopolysiloxane being present in the mixture in an amount sufficient to provide 0.9 to 1.1 mol of $\equiv$SiH per mol of vinyl substituent present in siloxane (a);
in the presence of platinum catalyst present in an amount sufficient to catalyze the addition reaction of $\equiv$SiH with $CH_2=CHSi\equiv$.

As shown in U.S. Pat. No. 4,234,713, the organopolysiloxane (b) above can be replaced by other silicon hydride cross-linkers such as, for example, $[H(CH_3)_2SiO]_3Si(C_6H_5)$. The silicon hydride crosslinker must have at least two silicon-bonded hydrogens per molecule.

The organopolysiloxane resins described in U.S. Pat. No. 4,234,713 can be obtained by reacting
(a) an organopolysiloxane containing from 67 to 85 mol percent $C_6H_5SiO_{3/2}$ units and 33 to 15 mol percent of $CH_2=CH(CH_3)_2SiO_{\frac{1}{2}}$ units, said organopolysiloxane having an average of at least 8 silicon atoms per molecule; with
(b) a silicon hydride containing polysiloxane crosslinker for (a), said (b) being present in an amount sufficient to provide about 0.9 to 1.1 mol of silicon hydride per mol of $CH_2=CHSi\equiv$ present in (a) and (c); and with
(c) a reactive diluent having the formula $$[CH_2=CH(CH_3)_2SiO]_2Si(C_6H_5)_2$$

in a ratio of 1:4 to 1:1 of component (c) to component (a);
in the presence of a platinum catalyst in an amount sufficient to catalyze the reaction of the silicon hydride with the $CH_2=CHSi\equiv$.

The compositions described in U.S. Pat. Nos. 3,944,519 and 4,234,713 differ, mainly, in that the composition of U.S. Pat. No. 4,234,713 contains the reactive diluent $[CH_2=CH(CH_3)_2SiO]_2Si(C_6H_5)_2$. Compositions containing the reactive diluent are one preferred species for use in the method of this invention.

The various components of the compositions of U.S. Pat. Nos. 3,944,519 and 4,234,713 can be prepared by conventional techniques known to those skilled in art, for example, the cohydrolysis of the corresponding chlorosilanes or alkoxysilanes. Component (a) of the above described organopolysiloxane resin of U.S. Pat. No. 3,944,519 consists of monophenylsiloxy units in the range of 75 to 85 mol percent and dimethylvinylsiloxy units in the range of 15 to 25 mol percent. Component (a) of the organopolysiloxane resin of U.S. Pat. No. 4,234,713 consists of monophenylsiloxy units in the range of 67 to 85 mol percent and dimethylvinylsiloxy units in the range of 15 to 33 mol percent. It is preferred that component (a) consist of about 75 mol percent of monophenylsiloxy units and about 25 mol percent of dimethylvinylsiloxy units. Although there does not appear to be any upper limit on the molecular weight of component (a), it should have a degree of polymerization of at least 8 silicon atoms per molecule. Component (a) can also be treated, for example, by alkaline condensation catalysts, to reduce the silanol content of the resin.

The silicon hydride containing siloxane (b) serves as a crosslinker and curing agent in the composition. Examples of suitable silicon hydride containing siloxanes include $[H(CH_3)_2SiO]_2Si(C_6H_5)_2$ and $[H(CH_3)_2SiO]_3SiC_6H_5$. The crosslinker must have at least two (2) silicon hydrogens per molecule. There must be enough of (b) present to give from 0.9 to 1.1 mole of silicon hydride per mole of alkenyl groups in the composition. Preferred is a ratio of 1 mol of silicon hydride to 1 of alkenyl for the best results.

The platinum catalyst can be any of the well-known forms of catalytic platinum, ranging from finely divided platinum metal to platinum on various carriers to the chloroplatinic acid and complexed platinums. Chloroplatinic acid in a small amount of solvent or $(R_3P)_2PtCl_2$ or

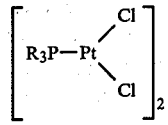

where R is methyl, ethyl, propyl or butyl are preferred. The most preferred platinum catalyst is $[(C_4H_9)_3PPtCl_2]_2$. There should be at least 0.1 parts by weight of platinum per million parts by weight of the combined total of components (a) and (b) for the organopolysiloxane resins of U.S. Pat. No. 3,944,519 and of the combined total of components (a), (b) and (c) for the organopolysiloxane resins of U.S. Pat. No. 4,234,713. It is preferred that platinum is present at a level of 1-20 part per million by weight.

Other organopolysiloxane resins which can be employed in the present invention include organopolysiloxane resins containing at least 0.25 percent by weight of silicon-bonded OH groups and having on the average from 0.9 to 1.8 monovalent hydrocarbon radicals per silicon atom wherein sufficient phenyl groups bonded directly to silicon are present to insure flowability in the pressing step (D). As indicated earlier, these organopolysiloxane resins must be of a thermosetting nature and also be capable of being transformed into a ceramic material. Within these limitations, these organopolysiloxane resins can be homopolymers or copolymers and can contain one or more units of the structure $SiO_2$, $ZSiO_{3/2}$, $Z_2SiO$, and $Z_3SiO_{\frac{1}{2}}$ in such combinations that the ratio of Z groups to silicon falls with in the 0.9 to 1.8 range. In general, flowability in the pressing step (D) will be insured if at least 5 percent by weight, and preferably 10 percent, of the Z groups in the resin are phenyl groups. The resin may contain up to several percent, say, for example, 10 percent by weight silicon-bonded OH groups but must contain a minimum of 0.25 percent by weight of silicon bonded OH groups. Curing or cross-linking in these organopolysiloxane resins generally occurs through silanol condensation.

For the purpose of this invention, Z in the above described structural units can be any monovalent hydrocarbon radical such as alkyl radicals such as methyl, ethyl, isopropyl, t-butyl, octadecyl or myricyl; any alkenyl hydrocarbon radical such as vinyl, allyl, hexenyl, or methallyl; any alkynyl hydrocarbon radical such as ethynyl; any cycloaliphatic hydrocarbon radical such as cyclopentyl, cyclohexyl, cyclohexenyl, methylcyclopentyl or methylcyclohexenyl; any aryl hydrocarbon radical such as phenyl, naphthyl, xenyl, tolyl, or xylyl and any arakyl hydrocarbon radical such as benzyl, betaphenylethyl or omega-phenylpropyl. In other words, siloxane units that may be present in the organopolysiloxane resin include, for example,

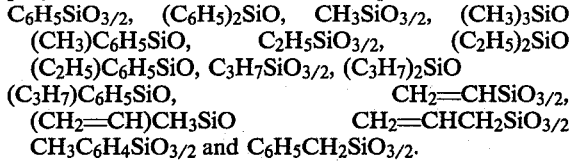

The preferred resins containing silanol groups for use in this invention are phenylmethylsiloxane resins, that is, resins containing siloxane units containing phenyl and methyl groups. In such phenylmethylsiloxanes it is preferred that the resin has phenyl to silicon ratio of 0.5:1 to 0.7:1 and other substituents to silicon ratio of 0.5:1 to 1:1 and a total phenyl and other substituent ratio of 1.1:1 to 1.6:1. One particularly preferred phenylmethylsiloxane resin contains about 45 mol percent $CH_3SiO_{3/2}$ units, 40 mol percent $C_6H_5SiO_{3/2}$ units, 5 mole percent $CH_3(C_6H_5)SiO$ units and 10 mole percent $(C_6H_5)_2SiO$ units.

The organopolysiloxanes containing SiOH groups employed in this invention are well known commercial materials. These resins are best prepared by hydrolysis of the corresponding silanes. The hydrolysis can be carried out by conventional techniques such as addition of a chlorosilane or mixture of chlorosilanes to an excess of water or alcohol. Resins prepared in this manner will generally have a SiOH content of about 1 to 10 percent by weight and in addition may contain alkoxy substituents bonded to silicon. Suitable organopolysiloxane resins are more fully described in the following U.S. Patents which are hereby incorporated by reference: Kookootsedes, U.S. Pat. Nos. 3,208,961 (Sept. 28, 1965); Antonen, 3,719,630 (Mar. 6, 1973); and Dennis and Vogel, 3,812,081 (May 21, 1974).

The organosilicone resins containing silanol groups can be used in this present invention with or without the addition of a silanol condensation catalyst. Composites prepared without such added catalysts will require higher cure temperatures and longer cure times. Therefore it is preferred that silanol condensation catalysts be employed when silanol containing organosilicone resins are employed in the practice of this invention. The silanol condensation catalysts are well known in the art. The condensation catalyst should only be active at elevated temperatures, preferably on the order of 50° to 150° C. Suitable catalysts include such metallic compounds as dibutyl tin dilaurate, dibutyl tin diacetate, stannous octoate, zinc octoate, cobalt naphthanate, and bis(acetylacetonate)diisopropyl titanate. Catalysts formed in situ can also be employed such as the catalyst combination which consists essentially of a lead compound selected from the group consisting of lead monoxide and lead carbonate and a compound selected from the group consisting of carboxylic acids and the ammonium salts of carboxylic acids as described in U.S. Pat. No. 3,208,961.

Other silanol condensation catalyst useful in the practice of this invention include quaternary ammonium salts of the formula $[QQ_3'N^+]_nY^-$ in which Q is selected from the group consisting of monovalent hydrocarbon radicals, in which there are no carbon-carbon aliphatic multiple bonds attached to carbon atoms alpha or beta to the nitrogen, saturated hydroxy aliphatic hydrocarbon radicals, saturated hydroxy cycloaliphatic hydrocarbon radicals and $Q_3''SiQ'''-$ radicals in which $Q''$ is a monovalent hydrocarbon radical or an alkoxy radical and $Q'''$ is a divalent hydrocarbon radical having no aliphatic carbon-carbon multiple bonds on the carbon atoms alpha or beta to the nitrogen, n is 1 or 2, $Q'$ is an aliphatic hydrocarbon radical or an aralkyl radical in both of which are are no carbon-carbon aliphatic multiple bonds on the carbon atoms alpha or beta to the nitrogen, $Q'$ containing less than 10 carbon atoms, and Y- is $NO_3$, halogen having an atomic weight greater than 19, $SO_4$ or $OSO_2OW$ where W is a lower alkyl radical. These quaternary ammonium salts are described more fully in U.S. Pat. No. 3,812,081. As known in the prior art, quaternary ammonium hydroxides, acylates, and alkoxides are also useful silanol condensation catalysts. Organic peroxides may also be used as the silanol condensation catalyst.

For the purpose of this invention the proportions of the silanol condensation catalyst to resin is not critical as long as there is sufficient catalyst to cure the resin to the desired extent and in the time required for the operation. Generally from 0.005 to 5 percent of the catalyst is sufficient. It should be understood, of course, that the rate of cure varies with the organosilicon resin being cured, with the precise catalyst employed, and with the temperature used. However, it is a simple matter to adjust the amount of catalyst relative to the rate of cure desired for any particular resin or catalyst system and for any particular temperature. Obviously the higher the temperature the faster is the cure.

The organopolysiloxane resins employed in this present invention may also contain conventional fillers if desired. Examples of such filler include $Al_2O_3$, $SiO_2$, other metallic oxides, SiC, and $Si_3N_4$ powders and the like.

The organopolysiloxane resin is first dissolved in an organic solvent prior to impregnating the high modulus fibers. Suitable solvents include the aliphatic and aromatic hydrocarbons. It is preferred that the solvent have a boiling point of less than about 125° C. at atmospheric pressure so that the drying of the impregnated fiber bundle can be carried out more easily. Preferred solvents include hexane, heptane, benzene and toluene. The solvent should be essentially water free by which is meant that the water content of the solvent should be less than about one percent by weight. Preferably, the solvent should contain only a trace or less of water. The amount of organopolysiloxane resin in solution can be varied over a wide range. The concentration of the organopolysiloxane resin in solution can be varied to effect the amount of organopolysiloxane resin that will impregnate the fiber bundle. In other words, the organopolysiloxane resin concentration can be varied to obtain various fiber volume percentages in the final, fired composite. Generally, 30 to 60 weight percent solutions of the organopolysiloxane resin are employed. The solutions can be filtered or centrifuged, if desired, to remove any insoluble materials.

The desired fiber is impregnated with the organopolysiloxane resin solution by any convenient means. The desired fiber may, if desired, be cleaned of sizing or other surface treatments as described above, prior to impregnation. The strands of fiber or the woven fabric can be immersed in the solution and drained of excess solution. The fibers can be wound on drums or spools and wetted with the organopolysiloxane resin solution. Other impregnation methods may be used.

Generally, it is advantageous to treat the fibers before impregnating them in order to enhance the adhesion of the matrix material to the fibers. As mentioned above, this is easily accomplished by treating the fibers with known adhesion promoting materials such as are common in the glass composite industry. After the fibers are treated in this manner, they are air dried and impregnated with the organopolysiloxane resin solution.

After excess solution has drained from the fibers, the product is dried. This is easily accomplished by allowing the impregnated fiber to stand at room temperature. The dried, impregnated fibers are commonly referred to as a "prepreg". The dried, impregnated fiber is then heated at an elevated temperature, on the order of 50° to 150° C. for several minutes to several hours. It has been found that heating at 100° C. for 10-15 minutes is generally sufficient. This heating step, also referred to as B-staging, which partially cures the resins, can be easily carried out in an air convection oven or similar equipment. Care should be taken to avoid temperature and time period combinations which result in excessive curing such that flowability of the resin in the later molding or pressing step is significantly reduced. The product or prepreg at this point is dry and easily handleable.

The prepreg is then pressed in order to form the composite into the desired shape and to cause uniformity of the resin matrix around the fibers. The pressing takes place at a temperature of about 100° to 300° C. for a few minutes to several hours. The externally applied pressure is on the order of a few pounds per square inch to 2500 psi. The temperature, time duration, and pressure should be selected so that the resin will flow throughout the mold. It has been found that pressing at about 175° C. for one-half hour at a pressure of about 2000 psi generally gives satisfactory results. Pressures lower than 1000 psi also give satisfactory results. Care should be taken to avoid temperatures and pressures such that the resin is forced out of the mold. In general, the actual pressure is not a critical parameter in the pressing step. The pressed composite is then further cured at a temperature not greater than 300° C. to insure complete or nearly complete cross-linking in a post curing step. A preferred schedule for post-curing has been found to be about 8 hours at 100° C. followed by 16 hours at 250° C. Other post-curing schedules can be used so long as the composite undergoes nearly complete or complete cross-linking and the temperature does not exceed 300° C. This post-curing can take place either in the mold with applied pressure or in a conventional oven or similar device without any applied pressure.

The pressed and cured product (the green composite) is then slowly fired in a furnace to a temperature of at least 1000° C. in an inert atmosphere or vacuum until the product ceramifies. It is preferred that the green composite be fired at a temperature of about 1200° C. By slow firing, it is meant that the composites are heated in a slow, stepwise fashion until the majority of any higher boiling volatiles present escape the composite after which time the temperature can be quickly raised to the ultimate firing temperature. For example, the temperature for most composites should be raised to about 300° C. and the heating slowly continued until a temperature of about 600° C. is reached after which the temperature can be raised rather quickly to the ultimate firing temperature. The effect that needs to be accomplished is the removal of the greater portion of any volatiles that are in the composite. For most composites, this occurs over about a 300° C. heating range and for the majority of composites prepared from the organopolysiloxane resins of this process, this range is 300° C. to 600° C. In order to establish the range for any given formulation, one can run a thermogravimetric analysis on the material to determine the temperature range at which the majority of volatiles are removed.

After completion of the firing process the composite is cooled. At least the initial cooling should also be under an inert atmosphere of vacuum. When cooled, the resulting material is a uniform, hard, strong fiber reinforced glass composite. The composites of this invention can have the volume percentage of fibers in the composites varying over a wide range depending upon the desired use. For most composites it is preferred that the composites have between 30 and 50 volume percent fibers.

Also contemplated within the scope of this invention is the repeat of steps A, B, E, F, and G of this invention on the already formed and fired fiber reinforced glass composites of this invention. Thus, it is within the scope of this invention to obtain a fiber reinforced composite from steps A through F of this invention and subject the fired composite to reimpregnation with the organopolysiloxane resin solution, drying, curing and firing. This repetition on an already fired composite allows one to raise the density (and consequently the physical strength) of the final composite. It is within the scope of this invention to repeat the steps A, B, E, F, and G, for a fired composite, multiple times in order to reach a high density, high strength product.

The fired composites can also be reimpregnated with colloidal metal oxide solutions. For example the fired composites can be reimpregnated with colloidal solutions of $SiO_2$, $Al_2O_3$, $ZrO_2$, $TiO_2$, or $SnO_2$. After reimpregnation, the composites are dried and then fired using the procedures of this invention.

The following examples are intended to illustrate the invention and should not be construed to limit the claims as set forth herein.

Test Procedures

Modulus of Rupture (MOR): The modulus of rupture or flexural strength was determined using ASTM D-790 procedure. Flexural test speciments were approximately 6.5 cm×1.0 cm×0.15 cm with specimen length parallel to the fiber axis. Load versus crosshead travel was measured in a three-point bending mode on a universal testing machine manufactured by the Instron Corporation, Canton, Mass. U.S.A. The machine had ⅜ in. diameter sapphire loading pins at a span of 2 in. The loading rate was 0.2 in./min. The span to thickness ratio (S/T, where S is the span on the testing machine and T is the sample thickness) was generally between 20 and 50.

EXAMPLE 1

An organopolysiloxane resin was prepared by hydrolyzing a mixture of 45 mol percent, methyltrichlorosilane, 40 mole percent, phenyltrichlorosilane, 5 mol percent, phenylmethyldichlorosilane, and 10 mol percent diphenyldichlorosilane at about 75° C. The hydrolysis was carried out in a mixture containing (by weight) 1 part of the chlorosilane mixture, 0.24 parts of isopropyl alcohol, 1.2 parts toluene, and 45 parts water. The resulting hydrolyzate was stripped at about 150° C. under a vacuum of 15–20 mm Hg. The resin was then flaked by cooling on rollers at about 15° C. The resulting organopolysiloxane was a copolymer of 45 mol percent monomethylsiloxane, 40 mol percent monophenylsiloxane, 10 mol percent diphenylsiloxane, and 5 mol percent phenylmethylsiloxane. The copolymer contained about 6 percent by weight silicon-bonded hydroxyl groups.

A bundle of Celanese Celion carbon fibers (6000 filaments per strand or tow) was prepared by wrapping the carbon fiber around a fourteen inch span 40 times. The individual carbon fibers had an average diameter of about 7 microns. The epoxy sizing on the fibers was removed, first by soaking the fiber bundle in acetone for three hours and then drying and heat treating the bundle by passing the bundle through a Bunsen burner flame until the fibers appeared fluffy. The bundle was then soaked in a toluene solution containing 0.05 weight percent of 3-glycidoxypropyltrimethoxysilane and 0.95 weight percent of Cymel 303. The fibers were then air-dried one hour at room temperature and then ten minutes at 110° C. in an air circulating oven. After cooling, the bundle was then soaked in a 60 percent by weight solution of the above described organopolysiloxane resin in toluene to which had been added a few drops of a solution a silicone glycol surfactant of general formula

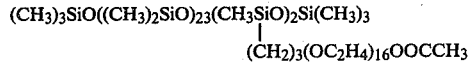

(10 weight percent in isopropanol) and few drops of a silanol condensation catalyst trimethyl beta-hydroxy ethyl ammonium-2-ethyl hexoate (20 weight percent in n-butanol). The catalyst was present at about 0.02 percent by weight.

The bundle was allowed to air dry for one hour and then it was partially cured (B-staged) by heating the bundle for ten minutes at 110° C. in an oven. This provided a dried handleable fiber bundle. After cutting to the desired length, the bundle of fibers (prepreg) was then pressed in a stainless steel mold at 175° C. for 30 minutes under a pressure of only a few psi (the pressure exerted by the weight of the mold). The mold was 3×5 in. with a internal cavity of about 3×0.5 in. The final thickness of the pressed prepreg depends upon the amount of matrix and fibers used and the molding pressure. The pressed prepreg was then post-cured at 100° C. for eight hours and then 250° C. for sixteen hours. This material was then fired in an Astro Industries water cooled graphite resistance furnace (Model 1000.3060-FP-12) to 1200° C. under a nitrogen atmosphere. The sample was heated from 200° to 800° C. at a rate of about 2° C. per minute and from 800° to 1200° C. at a rate of about 20° C. per minute. The composite was held at 1200° C. for 12 minutes. The total firing time was about 5.5 hours. The fired composite was about 7×1.2×0.2 cm and contained about 83 percent by weight fiber. The flexural strength was 20,017 psi (measured at a span to thickness ratio, S/T, of 44).

EXAMPLE 2

This example shows the use of a woven carbon fabric to prepare fiber reinforced glass composites. A carbon fabric (A-193P) from Hercules Incorporated, Magna, Utah, U.S.A. was employed. The epoxy sizing was removed by soaking a 12×13 inch sample in acetone and then heat treating it in the flame of a Bunsen burner. The fabric was treated with a one percent by weight solution of 3-glycidoxypropyltrimethoxysilane in toluene for 15 minutes. After air drying, the fabric was soaked in an organopolysiloxane resin solution as described in Example 1 (including both the silicone glycol surfactant and the condensation catalyst). The impregnated fabric was air dried for one hour and then partially cured by heating at 100° C. for ten minutes. The prepreg was then cut into 3.75 by 3.75 inch pieces. Eight pieces of the prepreg were placed one on top of another in a 4×4 inch flat-plate, stainless steel mold and pressed 30 minutes at 175° C. and a pressure of 100 psi. After cooling, the samples were removed from the press and post-cured eight hours at 100° C. and 16 hours at 250° C. The green composites were then cut into 1×3 inch pieces. The green composite were fired to 1100° C. in an argon atmosphere in a Lindberg (Watertown, Wis.) three zone tube furnace (Series 5400). The composite was heated from 200° to 600° C. at a rate of 3.3° C. per minutes, from 600° to 750° C. at 2.5° C. per minute, and from 750° to 1200° C. at 5.8° C. per minute. The composite were held at 1200° C. for 30 minutes for a total firing time of about 5 hours.

The fired composite was about 7.6×1.3×0.3 cm with a bulk density of about 1.0 g/cm³. The composite contained about 27 percent by volume or 40 percent by weight fiber and had a flexural strength of 2439 psi measured at an S/T ratio of 16.

EXAMPLE 3

This example demonstrates the reimpregnation of previously fired composites. Fired composites (1×3 inches) prepared in Example 2 containing carbon fabric were reimpregnated using the same impregnating solution as used in Example 2 (a 60 percent by weight organopolysiloxane resin solution in toluene containing a silicone glycol surfactant and silanol condensation catalyst). The fired composite was reimpregnated by soaking in the impregnating solution for 30 minutes, followed by drying at room temperature overnight and curing at 100° C. for one hour. The sample was reimpregnated a second time in the same manner except it was dried at room temperature for only one hour. The twice impregnated sample was fired in argon to 1200°

C. using the tube furnace and firing procedures described in Example 2.

The fired composite had a bulk density of about 1.2 g/cm³ and contained about 17 percent by volume or 25 percent by weight fiber. The flexural strength was 4466 psi (S/T=16).

EXAMPLE 4

This example shows the use of silicon carbide fibers in preparing the composites of this invention. Nicalon silicon carbide fibers, having an average diameter of 10 to 15 microns, from Nippon Carbon were employed. A fiber bundle was prepared by wrapping the fibers around a 26 inch span 60 times. The epoxy sizing was removed by acetone soaking followed by flame treatment as in Example 1.

Composites were prepared using the same impregnating solution and procedures as given in Example 1 except that (1) the present prepregs were partially cured (B-staged) at 100° C. for ten minutes and (b) the prepregs were pressed for 30 minutes at a temperature of 175° C. and pressure of 2000 psi.

A total of 14 silicon carbide composites were prepared. The flexural strengths ranged from 16,064 to 24,728 psi with an average of about 20,200 psi. (The S/T ratio was in the range of 15 to 30).

EXAMPLE 5

This example demonstrates the reimpregnation of silicon carbide containing composites. A bundle of silicon carbide fibers was prepared by wrapping the fibers around a 26 inch span 60 times. The bundle was soaked in acetone for two hours and air dried overnight. The fiber bundle was surface treated by soaking for 15 minutes in a 12.5 percent by weight solution of a mixture consisting of about 47 percent by weight of a copolymer containing $(CH_3)_3SiO_{\frac{1}{2}}$ and $SiO_2$ units, about 15 percent by weight of a trimethylsiloxy end-blocked dimethylsiloxane fluid with a viscosity of about 350 cS at 25° C., and about 38 percent by weight Stoddard Solvent, the mixture being dissolved in toluene. After drying, the fiber bundle was impregnated for 15 minutes in a 40% by weight solution of the organopolysiloxane described in Example 1 in toluene which contained the same catalyst and surfactant as described in Example 1. The impregnated bundle was dried overnight at room temperature and then B-staged at 100° C. for 10 minutes. The partially cured prepreg was pressed at 175° C. and 2000 psi for 30 minutes. After post curing for 8 hours at 100° C. and 16 hours at 250° C., the green composite was fired at 1200° C. under nitrogen.

Fired composites were then vacuum reimpregnated with a 20 percent by weight of the same oganopolysiloxane resin in toluene to which was added a trace amount of the same silicone glycol surfactant and catalyst used in the first impregnation. Samples were partially cured in a 100° C. oven for 30 minutes and a 150° C. oven for 30 minutes after each reimpregnation. After three reimpregnations the reimpregnated composites were fired at 1200° C. under nitrogen. The process of reimpregnation and firing was repeated several times. The results are presented in Table I.

TABLE I

| Total Number Firings | Bulk Density (g/cc) | Volume Percent Fiber | S/T | Flexural Strength (psi) |
|---|---|---|---|---|
| 1 | 1.9 | 67 | 23 | 16,986 |

TABLE I-continued

| Total Number Firings | Bulk Density (g/cc) | Volume Percent Fiber | S/T | Flexural Strength (psi) |
|---|---|---|---|---|
| 4 | 1.8 | — | 19 | 19,828 |
| 5 | 2.0 | — | 21 | 41,017 |

EXAMPLE 6

This example shows the use of various colloidal metal oxides as reimpregnating agents with silicon carbide fiber containing composites. Several silicon carbide fiber composites were prepared as described in Example 4 for use in this Example. The composite were reimpregnated with various colloidal metal oxides (20 weight percent solids in water) using the following procedure. The composites were placed in a vacuum chamber. After pulling a vacuum, the colloidal metal oxide solution was added so that the composite was completely covered. The vacuum was slowly released until the pressure reached one atmosphere. The sample remained in the metal oxide solution for about 10 to 15 minutes. The sample was then air dried for about two hours at room temperature and about two hours at 100° C. This reimpregnation procedure was repeated two additional times after which the reimpregnated composite was fired to 1200° C. under nitrogen as described in Example 1. This procedure was repeated such that each composite was fired a total of four times with three reimpregnations between each firing.

The colloidal metal oxides employed were (a) colloidal silica (Nalco AG 1041-L1281 from Nalco Chemical Co., Oak Brook, Ill.), (b) colloidal alumina (Nyacol L-A 2055 from Nyacol Inc., Ashland, Mass.), (c) colloidal zirconia (also available from Nyacol Inc.), and (d) colloidal silica which had been surface treated with methyltrimethoxysilane. The flexural strengths were measured as before except that a one inch span was used. The results are presented in the following Table II.

TABLE II

| Colloidal Metal Oxide | Total Number Firings | Bulk Density (g/cc) | Fiber Volume Percent | S/T | Flexural Strength (psi) |
|---|---|---|---|---|---|
| $SiO_2$ | 1 | 2.14 | 45 | 15 | 18,340 |
| $SiO_2$ | 4 | 2.10 | 49 | 16 | 43,525 |
| $Al_2O_3$ | 1 | 1.88 | 64 | 25 | 19,560 |
| $Al_2O_3$ | 4 | 1.92 | 69 | 9 | 29,489 |
| $ZrO_2$ | 1 | 1.75 | 53 | 12 | 15,993 |
| $ZrO_2$ | 4 | 1.99 | 58 | 13 | 30,945 |
| $SiO_2$[a] | 1[b] | 1.60 | 52 | 19 | 22,890 |
| $SiO_2$[a] | 4 | 2.05 | 58 | 12 | 32,900 |

[a]Colloidal silica modified with methyltrimethoxysilane
[b]Fired to 1300° C. under nitrogen.

EXAMPLE 7

This example shows the use of an organopolysiloxane polymer of general formula $C_6H_5SiO_{3/2}$ in preparing the composites of this invention. One part by weight of phenyltrimethoxysilane was hydrolyzed in a mixture consisting of 0.24 parts water and 0.43 parts toluene. After hydrolysis the mixture was stripped at 95° C. leaving a organopolysilane polymer $C_6H_5SiO_{3/2}$ with a silicon-bonded hydroxyl group concentration of about 6 percent by weight and a methoxy group concentration of about 2 percent by weight.

Composites were prepared using silicon carbide fibers as described in Example 4. Except for the impregnating solution and the use of silicon carbide fibers, the composites were prepared as described in Example 1. The impregnating solution consisted of a 50 percent by weight solution of the above described organopolysiloxane in toluene containing a trace amount of the silicone glycol surfactant described in Example 1 and a silanol condensation catalyst consisting of a mixture of 0.1 percent by weight zinc octoate and 0.075 percent by weight trimethyl beta-hydroxy ethyl ammonium 2-ethyl hexoate where the percentages of the catalysts are based on the total weight of the impregnating solution. Five composites were prepared by firing to 1200° C. under a nitrogen atmosphere using the procedure of Example 1. The results are given in Table III.

TABLE III

| Sample | Bulk Density (g/cc) | Volume Percent Fiber | S/T | Flexural Strength (psi) |
|---|---|---|---|---|
| 1 | 1.51 | 43 | 30 | 11,175 |
| 2 | 1.40 | 36 | 30 | 13,244 |
| 3 | 1.33 | 38 | 29 | 11,864 |
| 4 | 1.35 | 30 | 30 | 13,579 |
| 5 | 1.34 | 25 | 30 | 12,283 |

EXAMPLE 8

This example shows the preparation of fiber containing composite using an organopolysiloxane where curing occurs by the addition reaction of organopolysiloxanes containing SiH group to organopolysiloxanes containing $CH_2=CHSi\equiv$ groups. The organopolysiloxane resin was prepared by the procedures outlined in U.S. Pat. No. 4,234,713. The base resin was an organopolysilane containing 75 mol percent of $C_6H_5SiO_{3/2}$ units and 25 mole percent of $CH_2=CH(CH_3)_2SiO_{\frac{1}{2}}$ units and was prepared by the hydrolysis of phenyltrimethoxysilane and 1,3-divinyl-1,1,3,3-tetramethyl disiloxane. The cross-linker was $[H(CH_3)_2SiO]_3SiC_6H_5$ prepared by the hydrolysis of phenyltrimethoxysilane and $[H(CH_3)_2Si]_2O$. The diluent was $[CH_2=CH(CH_3)_2SiO]_2Si(C_6H_5)_2$ prepared by the hydrolysis of diphenyldimethoxysilane and 1,3-divinyl-1,1,3,3-tetramethyldisiloxane. The platinum employed was 1 percent by weight $[(C_4H_9)_3PPtCl_2]_2$ in toluene. The resin was prepared as a two part system. Part A consisted of 78.7 mol percent of the base resin and 21.3 mole percent of the crosslinker. Part B consisted of 75 mol percent of the base resin, 25 mol percent of the diluent and about 0.005 mole percent of the actual platinum catalyst. Both Part A and Part B were vacuum stripped to removing any residual solvents. The organopolysiloxane resin for impregnating was prepared by mixing ten parts by weight Part A with one part by weight Part B. Thus, the final composition contained about 78.4 mol percent base resin, 19.4 mol percent cross-linker, 2.3 mol percent diluent, and 0.00045 mol percent $[(C_4H_9)_3PPtCl_2]_2$. The catalyst level corresponds to about 10 ppm Pt in the organopolysiloxane composition.

The impregnating solution was prepared by dissolving the above described final organopolysiloxane resin in toluene to yield a 50 weight percent solution. For runs 4-6 below, a trace amount of the silicone glycol surfactant of Example 1 was added to the impregnating solution. A carbon fiber bundle was prepared and impregnated as in Example 1. The composites were prepared as described in Example 1 except that the prepregs were B-staged at 50° C. for ten minutes, pressed at 100° C. at 2000 psi for 30 minutes, and post-cured at 100° C. for one hour. The fired composites were all about 7.0×1.2×0.2 cm. The results are listed in the following Table IV.

TABLE IV

| Run | Bulk Density (g/cc) | Volume Percent Fibers | S/T | Flexural Strength (psi) |
|---|---|---|---|---|
| 1 | 1.2 | 40 | 27 | 15,499 |
| 2 | 0.9 | 31 | 26 | 19,150 |
| 3 | 1.2 | 39 | 29 | 18,130 |
| 4 | 1.1 | 44 | 29 | 15,286 |
| 5 | 1.1 | 41 | 29 | 16,153 |
| 6 | 1.1 | 39 | 29 | 14,039 |

That which is claimed is:

1. A method of preparing fiber reinforced glass composites which method comprises
    (A) impregnating high modulus fibers with a thermosetting organosilicone resin dissolved in an organic solvent;
    (B) forming a prepreg by drying the product from (A);
    (C) heating the dried product of (B) at an elevated temperature for a time sufficient to effect partial curing but to avoid excessive curing of the organosilicone resin;
    (D) pressing the prepreg from (C) at a temperature not greater than about 300° C.;
    (E) curing the pressed prepreg from (D) at a temperature not greater than about 300° C. for a time sufficient to insure complete or nearly complete cross-linking in the prepreg;
    (F) slowly firing the pressed and cured prepreg from (E) to a temperature of at least 1000° C. in an inert atmosphere or vacuum until a fiber reinforced glass composite is obtained; and
    (G) cooling the fiber reinforced glass composite.

2. A method as defined in claim 1 wherein said organosilicone resin is a composition containing
    (a) an organopolysiloxane containing from 75 to 85 mol percent $C_6H_5SiO_{3/2}$ units and 15 to 25 mol percent of $CH_2=CH(CH_3)_2SiO_{\frac{1}{2}}$ units, said organopolysiloxane having an average of at least 8 silicon atoms per molecule;
    (b) a silicon hydride containing polysiloxane cross-linker for (a), said (b) being present in an amount sufficient to provide about 0.9 to 1.1 mol of silicon hydride per mol of $CH_2=CHSi\equiv$ present in (a);
wherein, in said organosilicone resin, there is also present a platinum catalyst in an amount sufficient to catalyze the reaction of the silicon hydride with the $CH_2=CHSi\equiv$; and wherein said high modulus fibers are selected from the group consisting of carbon fibers and silicon carbide fibers and wherein said high modulus fibers are essentially undirectional and continuous.

3. A method as defined in claim 1 wherein said organosilicone resin is a composition containing
    (a) an organopolysiloxane containing from 75 to 85 mol percent $C_6H_5SiO_{3/2}$ units and 15 to 25 mol percent of $CH_2=CH(CH_3)_2SiO_{\frac{1}{2}}$ units, said organopolysiloxane having an average of at least 8 silicon atoms per molecule;
    (b) a silicon hydride containing polysiloxane cross-linker for (a), said (b) being present in an amount sufficient to provide about 0.9 to 1.1 mol of silicon hydride per mol of $CH_2=CHSi\equiv$ present in (a);
wherein, in said organosilicone resin, there is also present a platinum catalyst in an amount sufficient to catalyze the reaction of the silicon hydride with the $CH_2=CHSi\equiv$; and wherein said high modulus fibers are selected from the group consisting of carbon fibers and silicon carbide fibers and wherein said high modulus fibers form a woven fabric.

4. A method as defined in claim 1 wherein said organosilicone resin is a composition containing (a) an organopolysiloxane containing from 67 to 85 mol percent $C_6H_5SiO_{3/2}$ units and 33 to 15 mol percent of $CH_2=CH(CH_3)_2SiO_{\frac{1}{2}}$ units, said organopolysiloxane having an average of at least 8 silicon atoms per molecule;

(b) a silicon hydride containing polysiloxane crosslinker for (a), said (b) being present in an amount sufficient to provide about 0.9 to 1.1 mol of silicon hydride per mol of $CH_2=CHSi\equiv$ present in (a); and (c) a reactive diluent having the formula $$[CH_2=CH(CH_3)_2SiO]_2Si(C_6H_5)_2$$

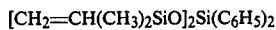

in a ratio of 1:4 to 1:1 of component (c) to component (a);
wherein, in said organosilicone resin, there is also present a platinum catalyst in an amount sufficient to catalyze the reaction of the silicon hydride with the $CH_2=CHSi\equiv$; and wherein said high modulus fibers are selected from the group consisting of carbon fibers and silicon carbide fibers and wherein said high modulus fibers are essentially undirectional and continuous.

5. A method as defined in claim 1 wherein said organosilicone resin is a composition containing (a) an organopolysiloxane containing from 67 to 85 mol percent $C_6H_5SiO_{3/2}$ units and 33 to 15 mol percent of $CH_2=CH(CH_3)_2SiO_{\frac{1}{2}}$ units, said organopolysiloxane having an average of at least 8 silicon atoms per molecule;

(b) a silicon hydride containing polysiloxane crosslinker for (a), said (b) being present in an amount sufficient to provide about 0.9 to 1.1 mol of silicon hydride per mol of $CH_2=CHSi\equiv$ present in (a); and (c) a reactive diluent having the formula $$[CH_2=CH(CH_3)_2SiO]_2Si(C_6H_5)_2$$

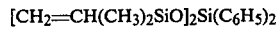

in a ratio of 1:4 to 1:1 of component (c) to component (a);
wherein, in said organosilicone resin, there is also present a platinum catalyst in an amount sufficient to catalyze the reaction of the silicon hydride with the $CH_2=CHSi\equiv$; and wherein said high modulus fibers are selected from the group consisting of carbon fibers and silicon carbide fibers and wherein said high modulus fibers form a woven fabric.

6. A method as defined in claim 2 wherein, in said organosilicone resin, component (b) is present in an amount sufficient to provide about 1.0 mole of silicon hydride per mole of $CH_2=CHSi\equiv$ in said organosilicon resin; and wherein said platinum catalyst is present in an amount sufficient to provide at least 0.1 parts by weight platinum per million parts by weight of said organosilicone resin.

7. A method as defined in claim 3 wherein, in said organosilicone resin, component (b) is present in an amount sufficient to provide about 1.0 mole of silicon hydride per mole of $CH_2=CHSi\equiv$ in said organosilicon resin; and wherein said platinum catalyst is present in an amount sufficient to provide at least 0.1 parts by weight platinum per million parts by weight of said organosilicone resin.

8. A method as defined in claim 4 wherein, in said organosilicone resin, component (b) is present in an amount sufficient to provide about 1.0 mole of silicon hydride per mole of $CH_2=CHSi\equiv$ in said organosilicon resin; and wherein said platinum catalyst is present in an amount sufficient to provide at least 0.1 parts by weight platinum per million parts by weight of said organosilicone resin.

9. A method as defined in claim 5 wherein, in said organosilicone resin, component (b) is present in an amount sufficient to provide about 1.0 mole of silicon hydride per mole of $CH_2=CHSi\equiv$ in said organosilicon resin; and wherein said platinum catalyst is present in an amount sufficient to provide at least 0.1 parts by weight platinum per million parts by weight of said organosilicone resin.

10. A method as defined in claim 6 wherein said platinum catalyst is $[R_3PPtCl_2]_2$ where R is selected from the group consisting of methyl, ethyl, propyl and butyl radicals and wherein said platinum catalyst is present in an amount sufficient to provide from about 1 to 20 parts by weight platinum per million parts of said organosilicone resin.

11. A method as defined in claim 7 wherein said platinum catalyst is $[R_3PPtCl_2]_2$ where R is selected from the group consisting of methyl, ethyl, propyl and butyl radicals and wherein said platinum catalyst is present in an amount sufficient to provide from about 1 to 20 parts by weight platinum per million parts of said organosilicone resin.

12. A method as defined in claim 8 wherein said platinum catalyst is $[R_3PPtCl_2]_2$ where R is selected from the group consisting of methyl, ethyl, propyl and butyl radicals and wherein said platinum catalyst is present in an amount sufficient to provide from about 1 to 20 parts by weight platinum per million parts of said organosilicone resin.

13. A method as defined in claim 9 wherein said platinum catalyst is $[R_3PPtCl_2]_2$ where R is selected from the group consisting of methyl, ethyl, propyl and butyl radicals and wherein said platinum catalyst is present in an amount sufficient to provide from about 1 to 20 parts by weight platinum per million parts of said organosilicone resin.

14. A method as defined in claim 1 wherein said organosilicone resin contains at least 0.25 percent by weight silicon-bonded hydroxyl groups and contains, on the average, 0.9 to 1.8 monovalent hydrocarbon radicals per silicon and wherein said organosilicone resin contains sufficient phenyl groups bonded directly to silicon to insure flowability of said organosilicone resin in step (D); and wherein said high modulus fibers are selected from the group consisting of carbon fibers and silicon carbide fibers and wherein said high modulus fibers are essentially undirectional and continuous.

15. A method as defined in claim 1 wherein said organosilicone resin contains at least 0.25 percent by weight silicon-bonded hydroxyl groups and contains, on the average, 0.9 to 1.8 monovalent hydrocarbon radicals per silicon and wherein said organosilicone resin contains sufficient phenyl groups bonded directly to silicon to insure flowability of said organosilicone resin in step (D); and wherein said high modulus fibers are selected from the group consisting of carbon fibers and silicon carbide fibers and wherein said high modulus fibers form a woven fabric.

16. A method as defined in claim 14 wherein said organosilicone resin is a copolymer which contains at least one of the units of structure $SiO_2$, $ZSiO_{3/2}$, $Z_2SiO$, and $Z_3SiO_{\frac{1}{2}}$ where Z is a monovalent hydrocarbon radical and where at least 5 percent by weight of the Z groups are phenyl.

17. A method as defined in claim 15 wherein said organosilicone resin is a copolymer which contains at least one of the units of structure $SiO_2$, $ZSiO_{3/2}$, $Z_2SiO$, and $Z_3SiO_{\frac{1}{2}}$ where Z is a monovalent hydrocarbon radical and where at least 5 percent by weight of the Z groups are phenyl.

18. A method as defined in claim 14 wherein, in said organosilicone resin, there is present a silanol condensation catalyst at a level of about 0.005 to 5 percent by weight based on the total weight of said organosilicone resin.

19. A method as defined in claim 15 wherein, in said organosilicone resin, there is present a silanol condensation catalyst at a level of about 0.005 to 5 percent by weight based on the total weight of said organosilicone resin.

20. A method as defined in claim 18 wherein said organosilicone resin is a phenylmethylsiloxane wherein the $C_6H_5$:Si ratio is in the range of 0.5:1 to 0.7:1, wherein the $CH_3$:Si ratio is in the range of 0.5:1 to 1.0:1, and wherein the $(C_6H_5+CH_3)$:Si ratio is in the range of 1.1:1 to 1.6:1.

21. A method as defined in claim 19 wherein said organosilicone resin is a phenylmethylsiloxane wherein the $C_6H_5$:Si ratio is in the range of 0.5:1 to 0.7:1, wherein the $CH_3$:Si ratio is in the range of 0.5:1 to 1.0:1, and wherein the $(C_6H_5+CH_3)$:Si ratio is in the range of 1.1:1 to 1.6:1.

22. A method as defined in claim 20 wherein said organosilicone resin is a phenylmethylsiloxane resin which contains about 45 mol percent $CH_3SiO_{3/2}$ units, about 40 mol percent $C_6H_5SiO_{3/2}$ units, about 5 mol percent $C_6H_5(CH_3)SiO$ units, and about 10 mol percent $(C_6H_5)_2SiO$ units.

23. A method as defined in claim 21 wherein said organosilicone resin is a phenylmethylsiloxane resin which contains about 45 mol percent $CH_3SiO_{3/2}$ units, about 40 mol percent $C_6H_5SiO_{3/2}$ units, about 5 mol percent $C_6H_5(CH_3)SiO$ units, and about 10 mol percent $(C_6H_5)_2SiO$ units.

24. A method as defined in claim 2 wherein the prepreg of step (B) is heated in step (C) at a temperature of 50° to 150° C. for a time sufficient to effect partial curing but to avoid excessive curing of the organosilicone resin; and wherein the prepreg from (C) is pressed in step (D) at a temperature of 100° to 300° C.

25. A method as defined in claim 3 wherein the prepreg of step (B) is heated in step (C) at a temperature of 50° to 150° C. for a time sufficient to effect partial curing but to avoid excessive curing of the organosilicone resin; and wherein the prepreg from (C) is pressed in step (D) at a temperature of 100° to 300° C.

26. A method as defined in claim 4 wherein the prepreg of step (B) is heated in step (C) at a temperature of 50° to 150° C. for a time sufficient to effect partial curing but to avoid excessive curing of the organosilicone resin; and wherein the prepreg from (C) is pressed in step (D) at a temperature of 100° to 300° C.

27. A method as defined in claim 5 wherein the prepreg of step (B) is heated in step (C) at a temperature of 50° to 150° C. for a time sufficient to effect partial curing but to avoid excessive curing of the organosilicone resin; and wherein the prepreg from (C) is pressed in step (D) at a temperature of 100° to 300° C.

28. A method as defined in claim 10 wherein the prepreg of step (B) is heated in step (C) at a temperature of 50° to 150° C. for a time sufficient to effect partial curing but to avoid excessive curing of the organosilicone resin; and wherein the prepreg from (C) is pressed in step (D) at a temperature of 100° to 300° C.

29. A method as defined in claim 11 wherein the prepreg of step (B) is heated in step (C) at a temperature of 50° to 150° C. for a time sufficient to effect partial curing but to avoid excessive curing of the organosilicone resin; and wherein the prepreg from (C) is pressed in step (D) at a temperature of 100° to 300° C.

30. A method as defined in claim 12 wherein the prepreg of step (B) is heated in step (C) at a temperature of 50° to 150° C. for a time sufficient to effect partial curing but to avoid excessive curing of the organosilicone resin; and wherein the prepreg from (C) is pressed in step (D) at a temperature of 100° to 300° C.

31. A method as defined in claim 13 wherein the prepreg of step (B) is heated in step (C) at a temperature of 50° to 150° C. for a time sufficient to effect partial curing but to avoid excessive curing of the organosilicone resin; and wherein the prepreg from (C) is pressed in step (D) at a temperature of 100° to 300° C.

32. A method as defined in claim 14 wherein the prepreg of step (B) is heated in step (C) at a temperature of 50° to 150° C. for a time sufficient to effect partial curing but to avoid excessive curing of the organosilicone resin; and wherein the prepreg from (C) is pressed in step (D) at a temperature of 100° to 300° C.

33. A method as defined in claim 15 wherein the prepreg of step (B) is heated in step (C) at a temperature of 50° to 150° C. for a time sufficient to effect partial curing but to avoid excessive curing of the organosilicone resin; and wherein the prepreg from (C) is pressed in step (D) at a temperature of 100° to 300° C.

34. A method as defined in claim 20 wherein the prepreg of step (B) is heated in step (C) at a temperature of 50° to 150° C. for a time sufficient to effect partial curing but to avoid excessive curing of the organosilicone resin; and wherein the prepreg from (C) is pressed in step (D) at a temperature of 100° to 300° C.

35. A method as defined in claim 21 wherein the prepreg of step (B) is heated in step (C) at a temperature of 50° to 150° C. for a time sufficient to effect partial curing but to avoid excessive curing of the organosilicone resin; and wherein the prepreg from (C) is pressed in step (D) at a temperature of 100° to 300° C.

36. A method as defined in claim 24 wherein the pressed and cured prepreg from (E) is slowly fired to a temperature of about 1200° C. in step (F).

37. A method as defined in claim 25 wherein the pressed and cured prepreg from (E) is slowly fired to a temperature of about 1200° C. in step (F).

38. A method as defined in claim 26 wherein the pressed and cured prepreg from (E) is slowly fired to a temperature of about 1200° C. in step (F).

39. A method as defined in claim 27 wherein the pressed and cured prepreg from (E) is slowly fired to a temperature of about 1200° C. in step (F).

40. A method as defined in claim 32 wherein the pressed and cured prepreg from (E) is slowly fired to a temperature of about 1200° C. in step (F).

41. A method as defined in claim 33 wherein the pressed and cured prepreg from (E) is slowly fired to a temperature of about 1200° C. in step (F).

42. A method as defined in claim 2 wherein the fiber reinforced glass composite of step (G) is subjected to steps (A), (B), (E), (F), and (G) one or more times.

43. A method as defined in claim 3 wherein the fiber reinforced glass composite of step (G) is subjected to steps (A), (B), (E), (F), and (G) one or more times.

44. A method as defined in claim 4 wherein the fiber reinforced glass composite of step (G) is subjected to steps (A), (B), (E), (F), and (G) one or more times.

45. A method as defined in claim 5 wherein the fiber reinforced glass composite of step (G) is subjected to steps (A), (B), (E), (F), and (G) one or more times.

46. A method as defined in claim 14 wherein the fiber reinforced glass composite of step (G) is subjected to steps (A), (B), (E), (F), and (G) one or more times.

47. A method as defined in claim 15 wherein the fiber reinforced glass composite of step (G) is subjected to steps (A), (B), (E), (F), and (G) one or more times.

48. A method as defined in claim 28 wherein the fiber reinforced glass composite of step (G) is subjected to steps (A), (B), (E), (F), and (G) one or more times.

49. A method as defined in claim 29 wherein the fiber reinforced glass composite of step (G) is subjected to steps (A), (B), (E), (F), and (G) one or more times.

50. A method as defined in claim 30 wherein the fiber reinforced glass composite of step (G) is subjected to steps (A), (B), (E), (F), and (G) one or more times.

51. A method as defined in claim 31 wherein the fiber reinforced glass composite of step (G) is subjected to steps (A), (B), (E), (F), and (G) one or more times.

52. A method as defined in claim 34 wherein the fiber reinforced glass composite of step (G) is subjected to steps (A), (B), (E), (F), and (G) one or more times.

53. A method as defined in claim 35 wherein the fiber reinforced glass composite of step (G) is subjected to steps (A), (B), (E), (F), and (G) one or more times.

54. A method as defined in claim 2, which method further comprises
   (H) impregnating the fiber reinforced glass composite of step (G) with a colloidal metal oxide solution where said metal oxide is selected from the group consisting of $SiO_2$, $Al_2O_3$, $ZrO_2$, $TiO_2$, and $SnO_2$;
   (I) drying the fiber reinforced glass composite of step (H);
   (J) slowing firing the fiber reinforced glass composite of step (I) to a temperature of at least 1100° C. in an inert atmosphere or vacuum; and
   (K) cooling the fiber reinforced glass composite of step (J);
   wherein steps (H) through (K) can be repeated one or more times.

55. A method as defined in claim 3, which method further comprises
   (H) impregnating the fiber reinforced glass composite of step (G) with a colloidal metal oxide solution where said metal oxide is selected from the group consisting of $SiO_2$, $Al_2O_3$, $ZrO_2$, $TiO_2$, and $SnO_2$;
   (I) drying the fiber reinforced glass composite of step (H);
   (J) slowing firing the fiber reinforced glass composite of step (I) to a temperature of at least 1100° C. in an inert atmosphere or vacuum; and
   (K) cooling the fiber reinforced glass composite of step (J);
   wherein steps (H) through (K) can be repeated one or more times.

56. A method as defined in claim 4, which method further comprises
   (H) impregnating the fiber reinforced glass composite of step (G) with a colloidal metal oxide solution where said metal oxide is selected from the group consisting of $SiO_2$, $Al_2O_3$, $ZrO_2$, $TiO_2$, and $SnO_2$;
   (I) drying the fiber reinforced glass composite of step (H);
   (J) slowing firing the fiber reinforced glass composite of step (I) to a temperature of at least 1100° C. in an inert atmosphere or vacuum; and
   (K) cooling the fiber reinforced glass composite of step (J);
   wherein steps (H) through (K) can be repeated one or more times.

57. A method as defined in claim 5, which method further comprises
   (H) impregnating the fiber reinforced glass composite of step (G) with a colloidal metal oxide solution where said metal oxide is selected from the group consisting of $SiO_2$, $Al_2O_3$, $ZrO_2$, $TiO_2$, and $SnO_2$;
   (I) drying the fiber reinforced glass composite of step (H);
   (J) slowing firing the fiber reinforced glass composite of step (I) to a temperature of at least 1100° C. in an inert atmosphere or vacuum; and
   (K) cooling the fiber reinforced glass composite of step (J);
   wherein steps (H) through (K) can be repeated one or more times.

58. A method as defined in claim 14, which method further comprises
   (H) impregnating the fiber reinforced glass composite of step (G) with a colloidal metal oxide solution where said metal oxide is selected from the group consisting of $SiO_2$, $Al_2O_3$, $ZrO_2$, $TiO_2$, and $SnO_2$;
   (I) drying the fiber reinforced glass composite of step (H);
   (J) slowing firing the fiber reinforced glass composite of step (I) to a temperature of at least 1100° C. in an inert atmosphere or vacuum; and
   (K) cooling the fiber reinforced glass composite of step (J);
   wherein steps (H) through (K) can be repeated one or more times.

59. A method as defined in claim 15, which method further comprises
   (H) impregnating the fiber reinforced glass composite of step (G) with a colloidal metal oxide solution where said metal oxide is selected from the group consisting of $SiO_2$, $Al_2O_3$, $ZrO_2$, $TiO_2$, and $SnO_2$;
   (I) drying the fiber reinforced glass composite of step (H);
   (J) slowing firing the fiber reinforced glass composite of step (I) to a temperature of at least 1100° C. in an inert atmosphere or vacuum; and
   (K) cooling the fiber reinforced glass composite of step (J);
   wherein steps (H) through (K) can be repeated one or more times.

60. A fiber reinforced glass composite as prepared by the method of claim 2.

61. A fiber reinforced glass composite as prepared by the method of claim 3.

62. A fiber reinforced glass composite as prepared by the method of claim 4.

63. A fiber reinforced glass composite as prepared by the method of claim 5.

64. A fiber reinforced glass composite as prepared by the method of claim 10.

65. A fiber reinforced glass composite as prepared by the method of claim 11.

66. A fiber reinforced glass composite as prepared by the method of claim 12.

67. A fiber reinforced glass composite as prepared by the method of claim 13.

68. A fiber reinforced glass composite as prepared by the method of claim 14.

69. A fiber reinforced glass composite as prepared by the method of claim 15.

70. A fiber reinforced glass composite as prepared by the method of claim 20.

71. A fiber reinforced glass composite as prepared by the method of claim 21.

72. A fiber reinforced glass composite as prepared by the method of claim 42.

73. A fiber reinforced glass composite as prepared by the method of claim 43.

74. A fiber reinforced glass composite as prepared by the method of claim 44.

75. A fiber reinforced glass composite as prepared by the method of claim 45.

76. A fiber reinforced glass composite as prepared by the method of claim 46.

77. A fiber reinforced glass composite as prepared by the method of claim 47.

* * * * *

UNITED STATES PATENT AND TRADEMARK OFFICE
CERTIFICATE OF CORRECTION

PATENT NO. : 4,460,640
DATED : July 17, 1984
INVENTOR(S) : Frank K. Chi, Gary L. Stark It is certified that error appears in the above-identified patent and that said Letters Patent is hereby corrected as shown below:

In column 5, line 29, "$(CH_3)_3SiO$" should read -- $(CH_3)_2SiO$ --.

In column 6, line 30, "which are are no" should read -- which are no --.

In column 8, line 33, "of vacuum" should read -- or vacuum --.

In column 8, line 68, "speciments" should read -- specimens --.

In column 10, lines 39 and 45, and column 12, line 15, "composite" should read -- composites --.

In column 10, line 43, "minutes" should read -- minute --.

In column 19, lines 49 and 64, and column 20, lines 11,26,41,56, "slowing" should read -- slowly --.

Signed and Sealed this

Ninth Day of April 1985

[SEAL]

Attest:

DONALD J. QUIGG

Attesting Officer    Acting Commissioner of Patents and Trademarks